United States Patent Office 3,272,612
Patented Sept. 13, 1966

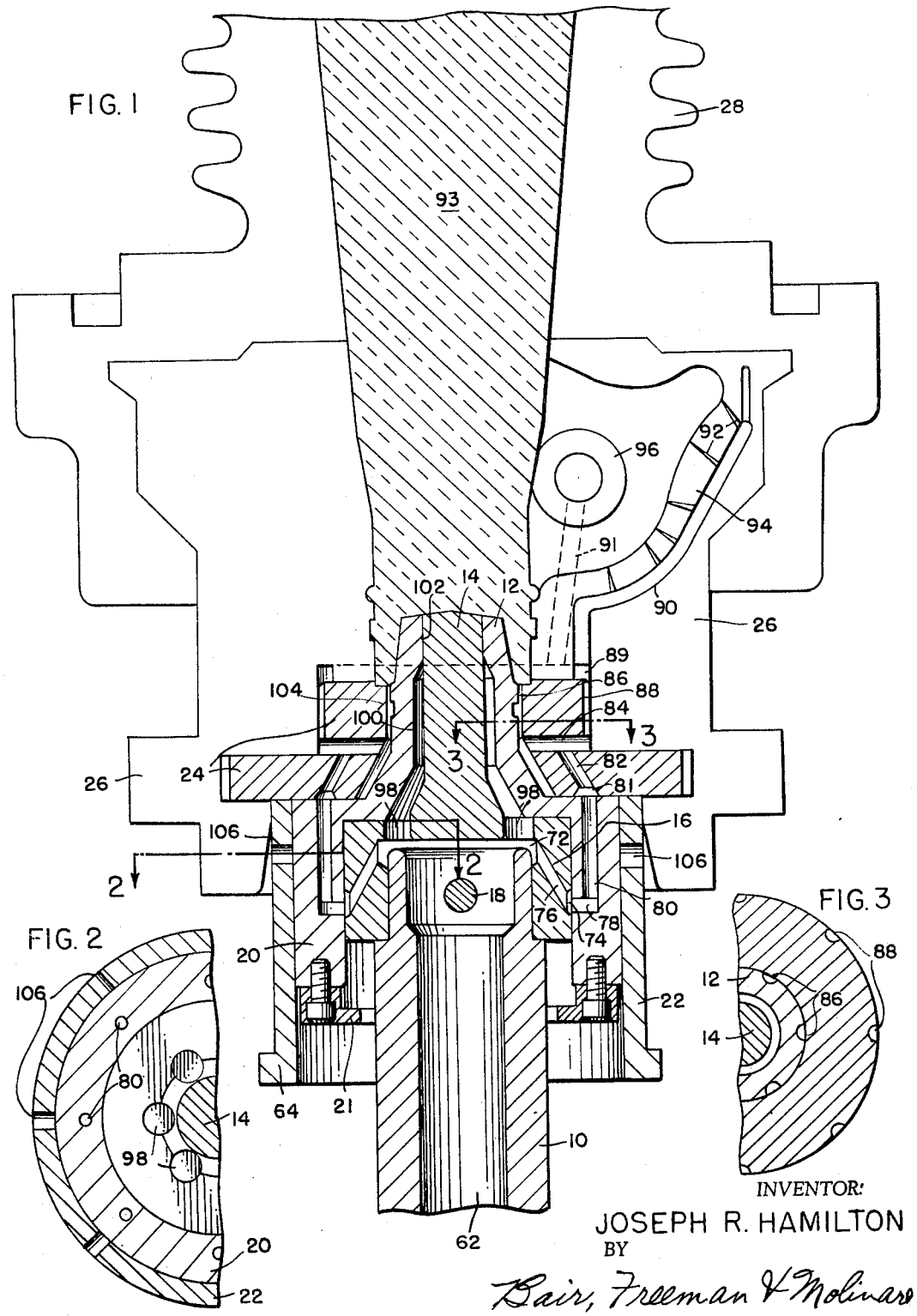

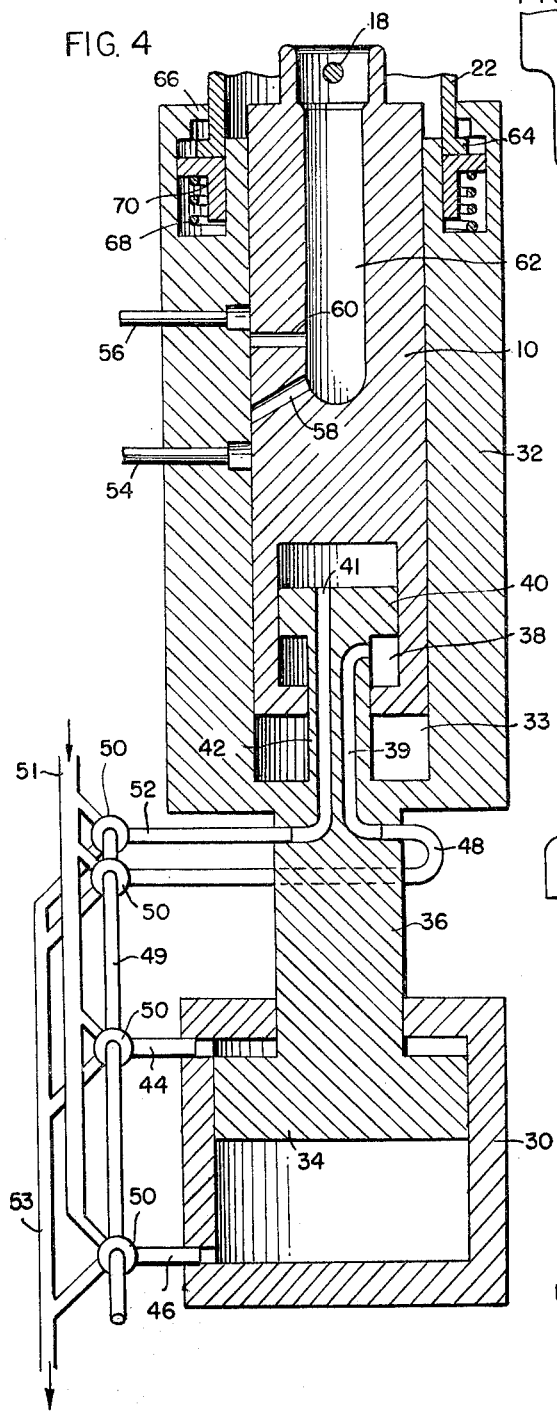
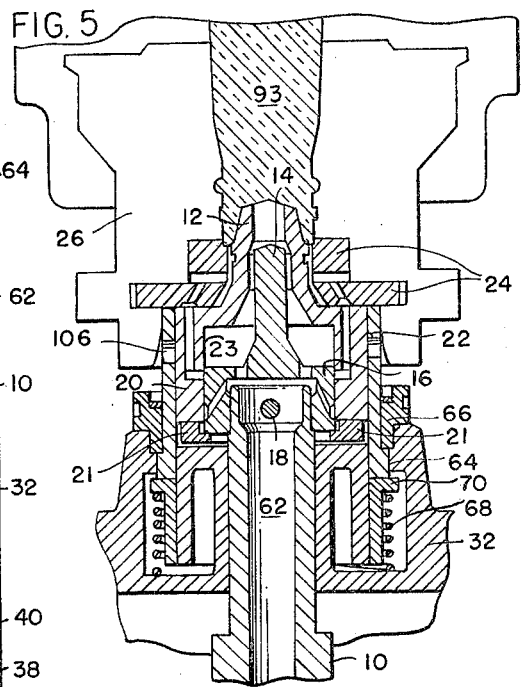
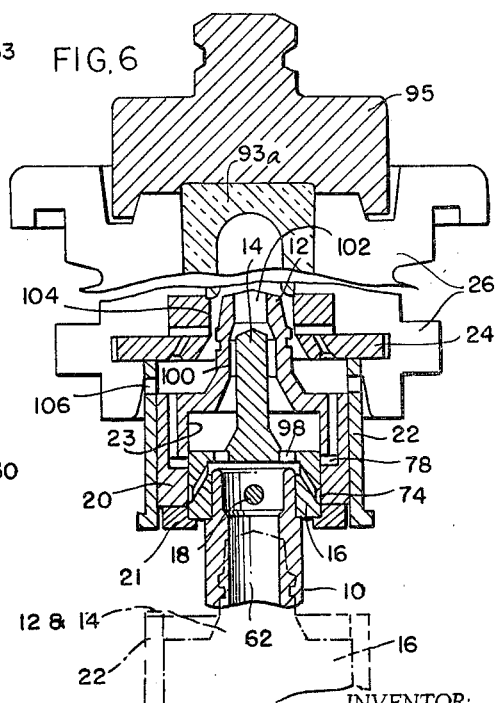

3,272,612
PARISON MOLD WITH FINISH PIN AND PLUNGER CONSTRUCTION FOR GLASSWARE FORMING MACHINES
Joseph R. Hamilton, Anderson, Ind., assignor to Lynch Corporation, Anderson, Ind., a corporation of Indiana
Filed June 3, 1963, Ser. No. 285,087
6 Claims. (Cl. 65—229)

This invention relates to a special type of hollow finish pin and a plunger therein used in a glassware forming machine to secure vacuum settling of the glass gob in a parison mold, positive counter blow and internal cooling.

One object of the invention is to provide a finish pin assembly comprising a combination of hollow finish pin having an outer piston and a finish pin plunger in the hollow finish pin having an inner piston within the outer piston, a finish pin cylinder being provided in which the outer and inner pistons are slidably mounted, the parts being so ported that counterblow air and vacuum therethrough, and cooling air therefrom, are controlled by the relative positions of the finish pin, finish pin plunger and finish pin cylinder. Accordingly when the parts are associated with a neck ring and are in one position a vacuum can be drawn inside the neck ring, and when in another position counter blow air can be discharged through the neck ring into the ware being blown and at the same time cooling air can be returned from the ware and discharged to atmosphere.

Another object is to provide a finish pin and plunger construction for association with a neck ring and a parison mold for the purpose of receiving a gob of glass in the parison mold and blowing the parison to shape therein, and to provide a carrier for the finish pin and plunger construction for effecting such association before receiving the glass and disassociation after blowing the parison for permitting the neck ring and parison to be carried to another station of the machine for blowing the finished ware.

Still another object is to provide an actuating rod for the hollow finish pin and the finish pin plunger of the finish pin assembly which is slidable relative to the carrier and thereby operable to move the finish pin and the finish pin plunger to different positions relative to the finish pin cylinder.

A further object is to provide main fluid pressure means to extend and retract the carrier relative to the neck ring, and secondary fluid pressure means to effect extension and retraction of the actuating rod relative to the carrier.

Still a further object is to provide a porting arrangement for the actuating rod with respect to the carrier for controlling the flow of counter blow air and vacuum conducted through the actuating rod to and from the finish pin and the finish pin plunger.

With these and other objects in view, my invention consists in the construction, arrangement and combination of the various parts of my finish pin and plunger construction for glassware forming machines, whereby the objects above contemplated are attained, as hereinafter more fully set forth, pointed out in my claims and illustrated in detail on the accompanying drawings, wherein:

FIG. 1 is a full size view of a finish pin and plunger construction eembodying my invention and showing the parts in position for receiving a gob of glass in a parison mold, actuating means for the finish pin and plunger construction being in up position;

FIG. 2 is a detailed sectional view on the line 2—2 of FIG. 1 showing certain porting and clearance spaces;

FIG. 3 is a detailed sectional view on the line 3—3 of FIG. 1 showing further porting arrangements;

FIG. 4 is a diagrammatic view showing the actuating means for my finish pin and plunger construction, its mid position being illustrated;

FIG. 5 is a half-size sectional view similar to FIG. 1 showing the finish pin plunger in a different position relative to the finish pin, the lower end of the figure being a continuation of the upper end of FIG. 4; and FIG. 6 is a sectional view similar to FIG. 5 showing the finish pin assembly in a different position relative to the finish pin cylinder, the actuating means therefor being in down position, and by dotted lines a different position of the finish pin and plunger construction relative to the neck ring and parison mold.

On the accompanying drawings I have used the reference numeral 10 to indicate an actuating rod for my finish pin and plunger construction. The construction itself (see FIG. 1) comprises a finish pin assembly of a hollow finish pin 12 within which is slidably mounted for limited movement a finish pin plunger 14. The plunger 14 has an inner piston 16 which is secured to the upper end of the actuating rod 10 by a cross pin 18. The hollow finish pin 12 has an outer piston 20 which is slidably mounted for limited movement in a finish pin cylinder 22. The piston 20 is tubular in character so as to also provide a finish pin plunger cylinder 23 for the inner piston 16 for the purpose of certain control porting arrangements which will hereinafter be described.

A stop plate 24 is mounted in a neck ring 26 of the glassware forming machine and serves as a shoulder for the upper end of the finish pin cylinder 22 to engage. A parison mold 28 is shown associated with the neck ring 26. Both the neck ring and the parison mold are of the split type and therefore are not sectioned on the drawing. Glass 93 is shown in the mold 28 ready to be counter blown.

Referring to diagrammatic FIG. 4, a carrier 32 is provided for the finish pin assembly 12–14 and has therein a guide cylinder 33 for the actuating rod 10. A main piston rod 36 extends downwardly from the carrier 32 and terminates in a main piston 34 located in a stationary cylinder 30. A secondary cylinder 38 is formed within the actuating rod 10 and a secondary piston 40 is located therein on an upwardly extending stem 42 of the carrier 32.

Fluid pressure connections 44 and 46 are provided for the main cylinder 30 and flexible fluid pressure connections 48 and 52 are provided for the secondary cylinder 38. The connections 48 and 52 communicate through passageways 39 and 41 with the cylinder 38 below and above the piston 40. These four connections may be cyclically controlled by timer rotors 50 on a hydraulic timer shaft 49. A fluid pressure supply 51 and return 53 are shown for the timer.

A counter blow air connection 54 and a vacuum connection 56 are provided for the carrier 32 and communicate with the guide cylinder 33, the actuating rod 10 having a counter blow air port 58 and a vacuum port 60 to coact with 54 and 56, respectively, for controlling the flow of air and vacuum as determined by the position of the actuating rod 10 relative to the carrier 32. The rod 10 also has a bore 62 for communicating the ports 58 and 60 with the finish pin assembly 12–14 as will hereinafter appear.

The finish pin cylinder 22 (FIG. 5) is connected with the carrier 32 by means of a flange 64 on the cylinder confined under a flange 66 of the carrier. The cylinder 22 is biased upwardly by a spring 68 under a sleeve 70, so that the pressure of this spring when the parts are in the position shown in FIGS. 1, 4 and 5 will insure tight contact of the upper end of the cylinder 22 with the plate 24, the plate thereby serving as a stop shoulder for the cylinder.

Within the finish pin and plunger construction (as shown in FIG. 1 for instance) the inner piston 16 has an annular port 72 connected by passageways 76 to an annular port 74. The port 74 coacts at times with an annular port 78 of the outer piston 20 and passageways 80 leading to an annular groove 81 in the lower surface of the plate 24 which in turn communicates by means of passageways 82 with radially extending passageways 84, the inner ends of which communicate with a bore 104 in the stop plate 24 so that the finish pin 12 when located therein may serve as a means to regulate the vacuum flow by reason of about .010" clearance indicated at 86 between the outside of the finish pin and the bore 104. The actuating rod 10 at this time would be up relative to the carrier 32 and the vacuum connection established between 56 and the port 60 of FIG. 4.

The outer ends of the passageways 84 may communicate vacuum by means of a groove 88 and an annular groove 89 to a special face groove 90 and passageway 91 in the neck ring 26 to facilitate the forming of a handle or the like on the glassware by face undercuts 94 (about .004" deep) communicating with the groove 90 through face grooves 92 and a face undercut 96 communicating with the passageway 91. In simpler types of ware such as shown in FIGS. 5 and 6, 88, 89, 90, 91, 92, 94 and 96 may be eliminated.

When the parts are in the position shown in FIGS. 5 and 6, the vacuum is cut off by reason of the ports 74 and 78 being out of alignment. Counter blow air is also cut off in FIG. 5 because of the relationship of ports 54, 56, 58 and 60 at that time as shown in FIG. 4. Counter blow air is supplied from 54 through the port 58 in the FIG. 6 position because the rod 10 is down relative to the carrier 32. This air flows from the bore 62 through passageways 98 in the top wall of the inner piston 16, through the cylindrical clearance indicated at 100 and into the ware being blown. Besides blowing the ware to shape, this counter blow air serves to cool the interior of the parison and this is accomplished by permitting it to discharge to atmosphere through the bore 104 of the stop plate 24 around the hollow finish pin 12 and finally out through open exhaust ports 106, as seen in the FIG. 6 position of the parts.

With respect to the limits of movement of the outer piston 20 and thereby the finish pin 12, the upward limit is determined by the stop plate 24 and the lower limit by the carrier 32. With respect to the limits of movement of the inner piston 16 and thereby the finish pin plunger 14, the upward limit is determined by the top wall of the outer piston 20 and the lower limit by the stop flange 21.

PRACTICAL OPERATION

In the operation of my finish pin and plunger construction, the parts are in the position of FIG. 1 at the time the gob of glass 93 is introduced into the parison mold 28. At this time the carrier 32 which constitutes actuating means for the finish pin and plunger construction is extended relative to the stationary cylinder 30 by supplying fluid pressure through the connection 46, and the actuating rod 10 is extended relative to the carrier 32 by introducing fluid pressure to the connection 52. This may be considered the up position of the actuating means. Vacuum is now available (since 60 is in alignment with 56) for settling the gob into the neck ring and closely about the finish pin.

After the glass has settled, the hydraulic timer 49–50 introduces fluid pressure through the connection 48 for drawing the actuating rod 10 downwardly relative to the carrier 32. About half the total stroke (mid position) is illustrated in FIGS. 4 and 5 and the finish pin plunger 14 it will be noted has been retracted from the hollow finish pin 12, and the lower end of the inner piston 16 has engaged the flange 21 on the lower end of the outer piston 20. The vacuum ports in the finish pin and plunger assembly are now closed and so is the vacuum port 60 relative to the vacuum connection 56.

FIG. 6 shows the down position of the rod 10 relative to the actuating means (carrier 32), the engagement of the inner piston 16 with the flange 21 having moved the outer piston 20 downwardly with the inner piston 16. Counter blow air is now being introduced from the connection 54 (which is now in alignment with 58) and bore 62 to the interior of the inner piston 16 and flows upwardly through the passageways 98 and then the cylindrical clearance indicated at 100 and through the bore 102 of the hollow finish pin into the parison (here shown as 93a) being blown. At this time also a baffle 95 is in position on the mold 28 against which the parison is blown.

The counter blow air also serves to cool the parison. After collecting heat therefrom it flows outwardly through the bore 104 in the stop plate 24 around the outside of the hollow finish pin and discharges to atmosphere through the exhaust ports 106. The total area of these ports is somewhat less than the openings 98 and/or the cylindrical clearance 100 so as to accord a proper amount of back pressure for efficient cooling.

After the parison 93a has been completely blown to shape in the parison mold 28, the finish pin and plunger construction is retracted as shown to the dotted-line position of FIG. 6 effected by introducing fluid pressure to the connection 44 of FIG. 4 for driving the piston 34 downwardly in the stationary cylinder 30, and introducing fluid pressure to the connection 52 for extending the actuating rod 10 relative to the carrier 32. The parts 10, 12, 14 and 22 are now in position for removal of the parison mold 28 so that the parison will be supported by the neck ring 26 and can be transferred to a blow station for blowing the parison to final shape and finally discharging it from the glassware forming machine. The finish pin and plunger construction is also in position for association of another neck ring and parison mold therewith for forming the next parison as soon as the parts are elevated to the position of FIG. 1 again by fluid pressure introduced to the connection 46.

From the foregoing specification it will be obvious that I have provided a special type of finish pin and plunger construction, and a mechanism for actuating the same, so as to secure the proper sequence of operations for vacuum settle after the gob of glass has entered the parison mold and blowing of the parison to shape, and at the same time efficiently cooling the parison as required.

Some changes may be made in the construction and arrangement of the parts of my finish pin and plunger construction without departing from the real spirit and purpose of my invention, and it is my intention to cover by my claims any modified forms of structure or use of mechanical equivalents which may reasonably be included within their scope.

I claim as my invention:

1. In a finish pin and plunger construction for glassware forming machines, a parison mold, a neck ring therefor, a stop plate in said neck ring and having a bore, a hollow finish pin movable into and retractable from said bore and having an outer tubular piston, a finish pin cylinder in which said outer tubular piston is slidably carried, a finish pin plunger movable in said hollow finish pin and having an inner piston slidably carried in said outer tubular piston, actuating means connected with said finish pin plunger for retracting it from said hollow finish pin and moving said inner piston down in said outer piston by movement of said actuating means from up position to mid position, said inner piston having limited movement in said outer piston whereby further movement of said actuating means from mid position to down position moves said outer piston away from said stop plate, said actuating means when moving in an upward direction first effecting movement of said inner piston to its opposite limit of movement at said mid position whereby further movement to said up position moves said outer piston into engagement with said stop plate, and port means for evacuating the interior of said neck ring in said up position, cutting off the vacuum in said mid position, and admitting counter blow air past said finish pin plunger through said hollow finish pin into the parison and discharge of cooling air from within the parison past said hollow pin through said bore of said stop plate and from said finish pin cylinder in said down position.

2. A finish pin and plunger construction in accordance with claim 1 wherein said port means comprises ports in said inner and outer pistons which coact with each other in said up position to effect a vacuum connection, said ports being out of alignment in said mid position to cut off the vacuum connection, said finish pin plunger when withdrawn from said hollow finish pin admitting counter blow air into the parison and discharge of cooling air therefrom in said down position.

3. A finish pin and plunger construction in accordance with claim 1 wherein said port means comprises coacting ports in said inner and outer pistons in said up position for communicating vacuum with the interior of said neck ring and ports in said finish pin cylinder uncovered by said outer piston in said down position for exhausting the cooling air therefrom.

4. A finish pin and plunger construction in accordance with claim 1 wherein said actuating means comprises a carrier for said finish pin plunger and provided with port means to communicate vacuum with the plunger in said up position and supply counterblow and cooling air to said plunger in said down position.

5. A finish pin and plunger construction in accordance with claim 1 wherein said actuating means comprises a rod operatively connected to said finish pin plunger and a carrier, said rod being slidable in said carrier, means to effect extension and retraction of said rod relative to said carrier, said carrier having vacuum and counterblow air connections and said rod and carrier having cooperating ports rendering the vacuum connection operative and the counterblow air connection inoperative in the up position of the rod, rendering neither connection operative in the mid position of the rod and rendering the vacuum connection inoperative and the counterblow air connection operative in the down position thereof, said carrier being retractable for removing said finish pin cylinder from contact with said stop plate and locating said hollow finish pin and finish pin plunger free of said neck ring after the parison is blown.

6. A finish pin and plunger construction in accordance with claim 5 wherein said carrier has means biasing said finish pin cylinder toward said stop plate for resilient engagement thereagainst in the up position of said rod.

References Cited by the Examiner
UNITED STATES PATENTS

| | | | |
|---|---|---|---|
| 1,670,821 | 5/1928 | Pawling et al. | 65—362 X |
| 1,679,502 | 8/1928 | Sears | 65—226 |
| 2,063,463 | 12/1936 | Rowe | 65—64 |
| 2,081,857 | 5/1937 | Howard | 65—64 |

DONALL H. SYLVESTER, *Primary Examiner.*

A. D. KELLOGG, *Assistant Examiner.*